United States Patent
Onozawa et al.

(10) Patent No.: US 6,773,778 B2
(45) Date of Patent: Aug. 10, 2004

(54) HARD COAT FILM

(75) Inventors: Yutaka Onozawa, Kawagoe (JP); Toshio Sugizaki, Omiya (JP); Satoshi Sakurai, Chiba (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/894,371

(22) Filed: Jun. 27, 2001

(65) Prior Publication Data

US 2002/0028312 A1 Mar. 7, 2002

(30) Foreign Application Priority Data

Jul. 19, 2000 (JP) ........................................ 2000-218934

(51) Int. Cl.[7] .............................. B32B 7/06; B32B 7/12; B32B 27/04; B32B 27/08
(52) U.S. Cl. .................... 428/40.1; 428/41.4; 428/41.7; 428/354; 359/359; 359/361; 65/60.1; 65/60.2; 65/60.8; 106/13
(58) Field of Search ........................... 428/34, 38, 40.1, 428/41.4, 41.7, 354; 359/359, 361; 65/60.1, 60.2, 60.8; 106/13

(56) References Cited

U.S. PATENT DOCUMENTS

| | | | |
|---|---|---|---|
| 3,810,815 A | * | 5/1974 | Welhart et al. ............. 161/183 |
| 4,634,637 A | | 1/1987 | Oliver et al. |
| 4,797,317 A | | 1/1989 | Oliver et al. |
| 4,900,778 A | | 2/1990 | Nagashima |
| 4,945,002 A | | 7/1990 | Tanuma et al. |
| 5,393,607 A | * | 2/1995 | Kawasaki et al. .......... 428/334 |
| 5,956,175 A | * | 9/1999 | Hojnowski ................. 359/360 |
| 6,103,370 A | * | 8/2000 | Onozawa et al. ........... 428/354 |
| 6,391,400 B1 | * | 5/2002 | Russell et al. ................ 428/34 |

FOREIGN PATENT DOCUMENTS

| | | |
|---|---|---|
| EP | 0 319 911 A2 | 6/1989 |
| GB | 2 048 167 A | 12/1980 |
| JP | 11-309813 | * 9/1999 |
| JP | 11-309813 | * 11/1999 |
| WO | WO 00/24576 A1 | 10/2002 |

* cited by examiner

*Primary Examiner*—Harold Pyon
*Assistant Examiner*—Brian P. Egan
(74) *Attorney, Agent, or Firm*—Webb Ziesenheim Logsdon Orkin & Hanson, P.C.

(57) ABSTRACT

A hard coat film is providend, having excellent resistance to impact and weather, and high surface hardness, which is suitable for being stuck on the external surfaces, e.g., those of window panes or plastic boards for windows. In the hard coat film, a silicon-base hard coat layer is provided on one side of a multi-layered base composed of a plurality of the same or different laminated resin films.

10 Claims, 2 Drawing Sheets

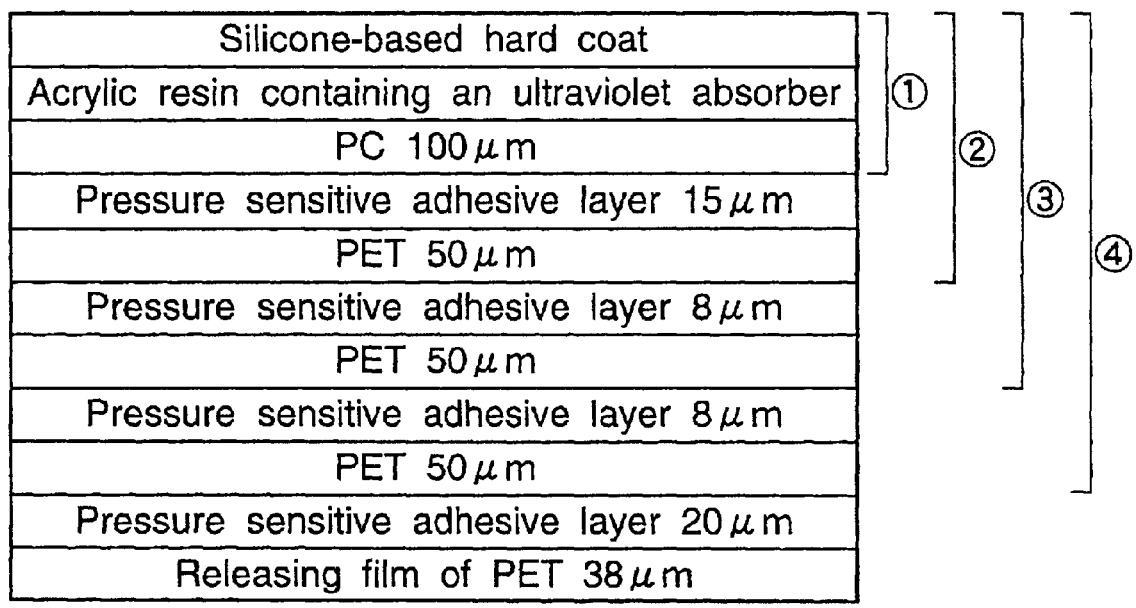

Fig. 1

| Silicone-based hard coat |
|---|
| Acrylic resin containing an ultraviolet absorber |
| PC 100 μm |
| Pressure sensitive adhesive layer 15 μm |
| PET 50 μm |
| Pressure sensitive adhesive layer 8 μm |
| PET 50 μm |
| Pressure sensitive adhesive layer 8 μm |
| PET 50 μm |
| Pressure sensitive adhesive layer 20 μm |
| Releasing film of PET 38 μm |

Fig. 2

| Silicone-based hard coat |
|---|
| Acrylic resin containing an ultraviolet absorber |
| PC 100 μm |
| Pressure sensitive adhesive layer 15 μm |
| PET 50 μm |
| Pressure sensitive adhesive layer 20 μm |
| Releasing film of PET 38 μm |

Fig. 3

| |
|---|
| Silicone-based hard coat |
| Acrylic resin containing an ultraviolet absorber |
| PC 100 μm |
| Pressure sensitive adhesive layer 15 μm |
| PC 100 μm |
| Pressure sensitive adhesive layer 20 μm |
| Releasing film of PET 38 μm |

① = Silicone-based hard coat + Acrylic resin containing an ultraviolet absorber + PC 100 μm
② = ① + Pressure sensitive adhesive layer 15 μm + PC 100 μm
③ = Pressure sensitive adhesive layer 20 μm + Releasing film of PET 38 μm

Fig. 4

| |
|---|
| Silicone-based hard coat |
| Acrylic resin containing an ultraviolet absorber |
| PC 100 μm |
| Pressure sensitive adhesive layer 20 μm |
| Releasing film of PET 38 μm |

① = Silicone-based hard coat + Acrylic resin containing an ultraviolet absorber + PC 100 μm

Fig. 5

| |
|---|
| Acrylic-based UV hard coat |
| PET 50 μm |
| Pressure sensitive adhesive layer 20 μm |
| Releasing film of PET 38 μm |

HARD COAT FILM

BACKGROUND OF THE INVENTION

1. Field of the Invention

The present invention relates to a novel hard coat film, more particularly a hard coat film having excellent resistance to impact and weather, and suitable for being stuck on external surfaces, in particular those of window panes and plastic boards for windows.

2. Description of the Prior Art

It is known to apply plastic films on window panes and plastic boards for windows for various purposes. For example, sunlight entering a room through a window pane contains ultraviolet and infrared rays, in addition to visible rays. The ultraviolet rays in sunlight causes sunburn. Its adverse effects on a human body have been recently pointed out, and it is well known that it deteriorates a packing material and content thereof. The infrared rays in sunlight, on the other hand, increase temperature in a room by direct sunlight, lowering an air-conditioning effect in summer. In order to avoid these undesirable effects, window panes and plastic boards for windows are covered with an ultraviolet- or infrared-shielding film. They are also frequently covered with a film for view-obstructing purposes, or for preventing fragment scattering when the window pane is broken by a hazard, e.g., earthquake. The above films for shielding ultraviolet or infrared rays, or for view obstruction also have an effect of preventing fragment scattering.

More recently, use of the above-described plastic films has been studied, to protect window panes of vehicles running at a high speed. For example, a train generates a high wind pressure when it is passing through a tunnel, thus blowing off pebbles and snow blocks which may directly attack the train's window panes. The plastic film for preventing the above troubles is especially required to be high resistant to impact, and also to be highly resistant to weather because it is put in service continuously under severe conditions.

A film to be stuck on window panes or plastic boards for windows (hereinafter sometimes referred to as a window film) is generally coated with a hard coat layer, such as that of ionization radiation-curable resin (e.g., polyester acrylate-, epoxy acrylate-, urethane acrylate- and polyol acrylate-based resin), coated and cured thereon, to provide the film having resistance to scratching. Incorporation of an ultraviolet scattering agent in the hard coat layer to provide resistance to weather may deteriorate the resistance of the hard coat surface to scratching. Incorporation of an ultraviolet absorber, on the other hand, may prevent curing by ionization radiation or deteriorate the resistance to scratching. It is therefore very hard for conventional hard coat films to provide a base film having a satisfactory effect of shielding ultraviolet rays. It is therefore generally stuck on an inner surface of the window pane or the like, because, when stuck on an outer surface, it may extensively deteriorate the hard coat layer and base film with ultraviolet rays, and contaminate the surface, to greatly decrease a film service life.

The hard coat film to be stuck on an inner surface is unsuitable as a wind film for the above-mentioned vehicles running at a high speed, because windows are directly attached by pebbles or snow blocks and their external surfaces must be protected.

Therefore, a hard coat film high in surface hardness, and excellent in resistance to impact and weather has been increasingly in demand, in particular for outdoor window films.

Japanese Patent Laid-Open No. 309813/1999 discloses a "hard coat film comprising a transparent base film coated, on its one side, with hard coat layers of an ultraviolet-shielding layer and a hard coat layer comprising silicon compound containing the siloxane bond in this order." Although this publication teaches that base film may be laminated film, examples thereof merely teach the single-layer base film. The hard coat film with the single-layer film as the base may not sufficiently protect glass, although preventing scattering of glass fragments, depending on degree of impact loaded thereon.

In order to solve the above problems, the present invention provides a preferably transparent hard coat film having excellent resistance to impact and weather and high surface hardness, which is particularly suitable for application, as by sticking on external surfaces, such as, for example, on window panes or plastic boards for windows.

SUMMARY OF THE INVENTION

The hard coat film of the present invention is characterized by comprising a silicone-based hard coat layer provided on one side of a multi-layered base composed of a plurality of the same or different resin films laminated.

The multi-layered base for the present invention may be a multi-layered film composed of a plurality of the same resin films laminated or a multi-layered film composed of a plurality of different films laminated.

In particular, when the multi-layered film composed of a plurality of different resin films laminated is used, it preferably contains a weather-resistant resin film and a impact-resistant resin film. In such a case, it is particularly preferable that the silicone-based hard coat layer is provided on the weather-resistant resin film.

The weather-resistant resin film is preferably of a resin film or a polycarbonate or polymethyl methacrylate film containing an ultraviolet absorber, of which a polycarbonate or polymethyl methacrylate film containing an ultraviolet absorber is more preferable.

The hard coat film of the present invention is suitably used by sticking the hard coat film on the external surfaces, e.g., those of window panes and plastic boards for windows.

The hard coat film of the present invention, having the above-mentioned unique structure, is resistant to impact and weather, high in surface hardness, and in particular suitable for application on external surfaces of window panes or plastic boards for windows.

The hard coat film of the present invention, having the above-mentioned unique structure, is resistant to impact and weather, high in surface hardness, and in particular suitable for being stuck on the external surfaces, e.g., those of window panes or plastic boards for windows.

BRIEF DESCRIPTION OF THE DRAWINGS

FIG. 1 is a schematic sectional view of the hard coat film prepared by Example 1;

FIG. 2 is a schematic sectional view of the hard coat film prepared by Example 2;

FIG. 3 is a schematic sectional view of the hard coat film prepared by Example 3;

FIG. 4 is a schematic sectional view of the hard coat film prepared by Comparative Example 1; and FIG. 5 is a schematic sectional view of the hard coat film prepared by Comparative Example 2.

DETAILED DESCRIPTION OF THE INVENTION

The present invention will be described in detail below.

The hard coat film of the present invention is characterized by comprising a silicone-based hard coat layer on one side of a multi-layered base composed of a plurality of resin films laminated.

The multi-layered base for the present invention may be a laminated film of the same resin films or different resin films. The number of these films is not limited, so long as two or more films are used.

The resin film for the multi-layered base is not limited, and may be adequately selected from various plastic films according to situations. The plastics used for the resin film include polyolefin-based resins, such as polyethylene, polypropylene, poly-4-methylpentene-1 and polybutene-1; polyester-based resins, such as polyethylene terephthalate and polyethylene naphthalate; polycarbonate-based resin; polyvinyl chloride-based resin; polyphenylene sulfide-based resin; polyether sulfone-based resin; polyethylene sulfide-based resin; polyphenylene ether-based resin; styrene-based resin; acrylic-based resin, such as polymethyl methacrylate; polyamide-based resin; polyimide-based resin; and cellulose-based resin, e.g., celulose acetate. Of these, polycarbonate-, acrylic- and polyester-based resins are preferable, and polycarbonate and polymethyl methacrylate are still more preferable.

Thickness of one layer of the film varies depending on its material and purpose of use, but is generally about 6 to 200 $\mu$m, preferably 50 to 150 $\mu$m.

Each film of the multi-layered base may be colored film or vapor-deposition film, or contain an ultraviolet absorber, as required. It may have improved resistance to weather, when incorporated with an ultraviolet absorber. An ultraviolet absorber absorbs ultraviolet rays of high energy, converts them into harmless energy, and reradiates them to bring an ultraviolet shielding effect and also to improve resistance to light and weather of the plastic in which it is incorporated. The ultraviolet absorbers can be roughly classified into salicylate-based, benzophenone-based, benzotriazole-based, substituted acrylonitrile-based and others. The salicylate-based ultraviolet absorbers include phenyl salicylate, p-octylphenyl salicylate and p-t-butylphenyl salicylate. The benzophenone-based ultraviolet absorbers include 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxybenzophenone, 2,4-dihydroxybenzophenone, and 2-hydroxy-4-octoxybenzophenone. The benzotriazole-based ultraviolet absorbers include 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-isobutylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole, 2-(2'-hydroxy-3',5'-di-tert-butylphenyl)benzotriazole, 2-(2'-hydroxy-5'-methylphenyl)benzotriazole, and 2-[2'-hydroxy-5'-(1,1,3,3-tetramethyl)phenyl]benzotriazole. The substituted acrylonitrile-based ultraviolet absorbers include ethyl 2-cyano-3,3-diphenyl acrylate, and 2-ethylhexyl 2-cyano-3,3-diphenyl acrylate. The other ultraviolet absorbers include resorcinol monobenzoate, 2,4-di-t-butylphenyl-3,5-di-t-butyl-4-hydroxybenzoate, and N-(2-ethylphenyl)-N'-(2-ethoxy-5-t-butylphenyl) diamide oxalate. A hindered amine compound, capable of improving resistance to light and weather, may be used as the light stabilizer, as required, in combination with the above-mentioned ultraviolet absorber. The above-mentioned ultraviolet absorbers may be used for the present invention either individually or in combination. The amount of the ultraviolet absorber in each film is not limited, and may be adequately set depending on its type and film type. However, it is generally in a range from 0.01 to 10% by weight, preferably 0.05 to 5% by weight. When the light stabilizer is used together, the total content of the ultraviolet absorber and light stabilizer is preferably in a range from 0.01 to 10% by weight, still more preferably 0.05 to 5% by weight.

Each film may be surface-treated, as required, for one or both sides by the oxidation or roughening, to make it more adhesive to another layer laminated thereon. It may be treated with corona discharge, chromate (wet process), flame, hot air, ozone or ultraviolet ray for the oxidation, or sand-blasted or treated with a solvent for the surface roughening. The adequate surface treatment method is selected for a specific type of the base film, and normally the corona discharge method is selected for its effectiveness and operability.

The multi-layered base for the present invention is a laminate composed of one or more types of films selected from the above described films. The total thickness of the multi-layered base is not limited, and may be adequately selected for specific purposes. However, it is normally 350 $\mu$m or less, preferably 100 to 250 $\mu$m.

There are various common methods for laminating films; e.g., those using an adhesive or pressure sensitive adhesive, dry lamination which uses no adhesive agent or the like, and a combination thereof. Another method for producing the multi-layered base is to apply a liquid material forming another films on one film, and cure the liquid material to form the other film.

The adhesive and pressure sensitive adhesives useful for the present invention are not limited, and conventionally know acrylic-, polyether-, silicone-, and rubber-based agents may be used. The quantity of the adhesive or pressure sensitive adhesive is not limited, so long as a total thickness of the multi-layered base is in the above-described range.

When the multi-layered base is composed of one type of films, the film is preferably made of polycarbonate or polymethyl methacrylate.

When the multi-layered base is composed of a plurality of types of different films, a combination of the films of different characteristics is preferable. More concretely, a combination of a weather-resistant resin film and impact-resistant resin film is particularly preferable.

The preferable weather-resistant resin film is the one which shows no abnormality in appearances when exposed to severe outdoor environments for long periods. It should be noted that a film of untreated polyethylene terephthalate may have abnormality on the surface in almost one year.

The weather-resistant films useful for the present invention include those of styrene-based resins, such as acrylonitrile-styrene, acrylonitrile-butadiene-styrene, acrylonitrile-acrylic rubber-styrene and acrylonitrile-chlorinated polyethylene-styrene resins; those of polycarbonate and polymethyl methacrylate resins; and the common resins, including the above resins, incorporated with the above-described ultraviolet absorber. Of these, the films of polycarbonate, polymethyl methacrylate and the common resins incorporated with the above-described ultraviolet absorber are preferable, and those of polycarbonate and polymethyl methacrylate resins incorporated with the above-described ultraviolet absorber are more preferable.

The weather-resistant resin film has a thickness similar to that described above, and may be surface-treated by the method selected from the above-described ones.

A combination of a plurality of types of different weather-resistant films may be used, or a plurality of weather-resistant films of the same type may be used for the present invention. Another type of film, such as a film of impact-resistant resin, may be incorporated therebetween.

The film of impact-resistant resin for the present invention preferably has a Charpy impact strength of 10 kg-cm/cm² or more, determined in accordance with JIS K-7111. In this case, the single film of impact-resistant resin may have a Charpy impact strength of 10 kg-cm/cm² or more, or a plurality of films may have the strength of 10 kg-cm/cm² or more, when laminated, even when the single film has the strength less than 10 kg-cm/cm². The films of impact-resistant resins useful for the present invention include those of polyethylene, polypropylene, polystyrene, polycarbonate, polyethylene terephthalate and polyethylene naphthalate. Of these, the films of polyethylene terephthalate and polyethylene naphthalate are preferable, and the film of polyethylene terephthalate is still more preferable.

The film of impact-resistant resin has a thickness similar to that described above, and may be surface-treated by the method selected from the above-described ones.

A combination of a plurality of types of different impact-resistant films may be used, or a plurality of impact-resistant films of the same type may be used for the present invention. Another type of film, such as a film of impact-resistant resin, may be incorporated therebetween.

The hard coat film of the present invention comprises a silicone-based hard coat layer formed on the above-described multi-layered base.

The silicone-based hard coat layer contains a silicon compound having a siloxane bond. The preferable examples of the hard coat layer include the one containing an inorganic silica-based compound (including polysilicate) and/or polyorganosiloxane-based compound as the major component(s).

The inorganic silica-based compound, polyorganosiloxane-based compound or a mixture of thereof may be produced by various methods, described below.

For example, one of the preferable methods involves partially or completely hydrolyzing of an alkoxysilane, represented by the general formula [1]:

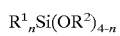   [1]

wherein, $R^1$ is an alkyl, substituted alkyl (substituent: a halogen atom, epoxy group, (meth)acryloyloxy group or the like), alkenyl, aryl or aralkyl group which is not hydrolyzable; $R^2$ is a lower alkyl group; and "n" is an integer of 0 or 1 to 3; when a plurality of $R^1$s are present, they may be the same or different from each other; and when a plurality of $OR^2$s are present, they may be the same or different from each other) in the presence of an inorganic acid (e.g., hydrochloric or sulfuric acid) or organic acid (e.g., oxalic or acetic acid), and subsequent polycondensation. In this case, the complete hydrolysis of tetraalkoxysilane (i.e., the compound represented by the general formula [1] with "n" of zero) produces an inorganic silica-based binder, and partial hydrolysis of the above compound produces a polyorganosiloxane-based binder or mixed inorganic silica-based and polyorganosiloxane-based binder. On the other hand, the complete or partial hydrolysis of the compound represented by the general formula [1] with "n" of 1 to 3 produces a polyorganosiloxane-based binder, because of the non-hydrolyzable group in the compound. In this case, an adequate organic solvent may be used to uniformly effect the hydrolysis.

The examples of the alkoxysilane compounds represented by the general formula [1] include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, vinyltrimethoxysilane, vinyltriethoxysilane, divinyldimethoxysilane, divinyldiethoxysilane, trivinylmethoxysilane, and trivinylethoxysilane.

They may be used either individually or in combination. An adequate quantity of aluminum compound, such as aluminum chloride or trialkoxyaluminum may be optionally incorporated. Another method involves the hydrolysis of sodium meta-silicate, sodium ortho-silicate or water glass (mixture of sodium silicates) as the starting silicon compound with an acid, such as hydrochloric, sulfuric or nitric acid or metallic compound (e.g., magnesium chloride or calcium sulfate). A free silicic acid is formed by the above hydrolysis, but is easily polymerizable. It is a mixture of chain-like, cyclic and net-like structures, depending on the stock type.

The polysilicate produced from water glass is mainly composed of the chain-like structure represented by the general formula [2]:

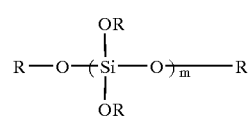   [2]

wherein, "m" represents a degree of polymerization; R is hydrogen, silicon or a metal, such as magnesium or aluminum. Thus, the complete inorganic silica-based binder is produced. Silica gel ($SiO_x \cdot nH_2O$) maybe used as the inorganic silica-based binder.

It is important for the hard coat layer to have the required hard coat functions. Therefore, it preferably contains as much inorganic silica-based compound as possible within a range maintaining the required adherence to base. Moreover, the hard coat layer may incorporate, as required, an inorganic ultraviolet scattering agent within a range not harmful to the resistance to scratching. The hard coat layer may be formed by coating the solution containing the hard coat agent on the multi-layered base by a known method, such as bar, knife, roll, blade, die or gravure coating, and then curing the resultant layer by heating.

The hard coat layer thus produced is normally 0.05 to 30 μm thick, preferably 1.0 to 20 μm thick.

The hard coat is formed on one side of the above-mentioned multi-layered base. When the multi-layered base is a laminate of the weather-resistant and impact-resistant films, the hard coat layer is preferably formed on the weather-resistant film.

The multi-layered base may be surface-treated on the side to be provided with the hard coat layer or on both sides, as required, by the oxidation or roughening, to make it more adhesive to the hard coat layer. It may be treated with corona discharge, chromate (wet process), flame, hot air, ozone or ultraviolet ray for the oxidation, or sand-blasted or treated with a solvent for the surface roughening. The adequate surface treatment method is selected for a specific type of the base film, and normally the corona discharge method is selected for its effectiveness and operability.

A primer layer may have been provided on the surface of the multi-layered base, as required, on which the hard coat is to be formed. The primer is not limited, and may be selected from the known ones, such as acrylic-, polyester-, polyurethane-, silicone- and rubber-based ones, of which acrylic- and polyester-based primers are preferable for their durability and adherence. The primer may be incorporated, as required, with an ultraviolet absorber or light stabilizer. The primer layer is preferably 0.1 to 10 $\mu$m thick for uniform coating and adherence, more preferably 0.5 to 5 $\mu$m thick.

The hard coat film of the present invention may be provided with a releasing sheet via an adhesive layer on the side opposite to the side having been provided with the hard coat layer of the multi-layered base. The adhesive agent which constitutes the adhesive layer is not limited, and may be adequately selected from the known ones for specific purposes. The adhesive agents useful for the present invention include natural rubber-, synthetic rubber-, acrylic-, polyvinyl ether-, urethane- and silicone-based ones. The examples of the synthetic rubber-based adhesive agents include styrene-butadiene rubber, polyisobutylene rubber, isobutylene-isoprene copolymer, styrene-isoprene block copolymer, styrene-butadiene block copolymer, and styrene-ethylene-butylene block copolymer. The examples of acrylic-based adhesive agents include homopolymers and copolymers of acrylic acid, methyl acrylate, ethyl acrylate, propyl acrylate, butyl acrylate, 2-ethylhexyl acrylate, ethyl methacrylate, butyl methacrylate, and acrylonitrile. The polyvinyl ether-based adhesive agents include polyvinyl ether and polyvinyl isobutyl ether. The examples of silicone-based adhesive agents include dimethyl polysiloxane. These adhesive agents may be used either individually or in combination. The adhesive agent may be further incorporated, as required, with one or more additives, such as tackifier, filler, softening agent, antioxidant, ultraviolet absorber and crosslinking agent. The tackifiers useful for the present invention include resins of rosin, terpene-phenol, terpene, terpene modified with an aromatic hydrocarbon, petroleum, coumarone-indene, styrene, phenol and xylene. The fillers include zinc white, titanium oxide, silica, calcium carbonate and barium sulfate. The softening agents include a process oil, liquid rubber and plasticizer. The antioxidants include anilide-based, phenol-based and thioester-based ones. The ultraviolet absorbers include benzophenone- and benzotriazle-based ones. The crosslinking agents include epoxy-, isocyanate- and metallic chelate-based ones.

Of the above-described adhesive agents, the acrylic-, urethane- and silicone-based ones are more preferable for their resistance to weather. The adhesive layer is normally 5 to 100 $\mu$m thick, preferably 10 to 60 $\mu$m thick. The releasing sheet to be provided on the adhesive layer may be of paper such as glassine, coated or laminated paper, various types of plastics or the like coated with an releasing agent, such as silicone resin. Thickness of the releasing layer is not limited, but normally 20 to 150 $\mu$m or so. The hard coat film of the present invention is particularly suitable for being stuck on external surfaces, e.g., those of window panes and plastic boards for windows. When it is to be used, it is put on the object with which the adhesive layer comes into contact after the releasing sheet is removed. The hard coat film of the present invention may be colored or printed, as required, on any of its layers except the hard coat layer.

It will, thus, be understood that the hard coat film of the present invention, having the above-mentioned unique structure, is resistant to impact and weather, high in surface hardness, and in particular suitable for being stuck on the external surfaces, e.g., those of window panes or plastic boards for windows.

EXAMPLES

The present invention will be described by EXAMPLES, which by no means limit the present invention.

The "change of appearances of the sample tested for resistance to weather," "adherence of the coating film (hard coat layer) tested for resistance to weather," "resistance to scratching of the sample tested for resistance to weather," and "falling ball test results" were evaluated by the following procedures:

"Change of appearances of the sample tested for resistance to weather"

The sample was subjected to the accelerated weather-resistance test for 1000 hours using a Sunshine Super Long-life Weatherometer (Suga Test Instrument Co., Ltd., WEL-SUN-HCH), and the tested hard coat film was visually observed for its appearances.

"Adherence of the coating film (hard coat layer) tested for resistance to weather"

The sample was subjected to the accelerated weather-resistance test for 1000 hours using a Sunshine Super Long-life Weatherometer (Suga Test Instrument Co., Ltd., WEL-SUN-HCH), and the tested sample was evaluated by the check-patterned tape method, in accordance with JIS K-5400.

"Resistance to scratching of the sample tested for resistance to weather"

The sample was subjected to the accelerated weather-resistance test for 1000 hours using a Sunshine Super Long-life Weatherometer (Suga Test Instrument Co., Ltd., WEL-SUN-HCH), and the tested hard coat film was rubbed on the hard coat layer surface with steel wool (#0000) to observe the surface conditions. The sample was marked with good when it had no scratches on the coat layer, and with bad when it was scratched or whitened.

"Falling ball test results"

The A4-size hard coat film was adhered on a 3 mm thick float glass, fringed by the frame of the same size, and set at 30 cm from the ground with the hard coat layer up. Then, an iron ball of 875 g was dropped onto the hard coat film put on the float glass from a height of 18 cm above the film, to observe the appearances of the hard coat film and float glass. The sample was marked with good when the glass showed no abnormality, and with bad when it was cracked, although not scattered.

Example 1

A 100 $\mu$m thick polycarbonate film (Sansei Bussan Co., Ltd., Lexan 8010) was used as the base film, and coated on one side with an acrylic resin containing an ultraviolet absorber ((Nippon Dacro Shamrock Co., Ltd., SolGard Primer 85B-2) to form the primer layer (adhesion-improving layer) by a Meyer bar to a thickness of 5 $\mu$m on a dry basis, dried at 100° C. for 1 minute. The primer layer was further coated with a silicone-based hard coating agent (Nippon Dacro Shamrock Co., Ltd., SolGard NP-730) by a Meyer bar to a thickness of 3 $\mu$m on a dry basis, dried at 130° C. for 3 minutes, to prepare the hard coat film. This coated film is referred to as Material 1.

Next, a 50 μm thick polyethylene terephthalate film (Toyobo Co., Ltd., A4300, Charpy impact strength: 25 kg-cm/cm$^2$) was coated with an acrylic-based adhesive (Lintec Corp., PU-V) by a comma coater to form the adhesive layer to a thickness of 15 μm on a dry basis, dried at 100° C. for 3 minutes. The polycarbonate film surface of Material 1, i.e., the side not coated with the silicone-based hard coating agent, was attached on the above-mentioned adhesive layer. This laminated film is referred to as Material 2.

The polyethylene terephthalate film surface of Material 2 was provided with an 8 μm thick acrylic-based adhesive layer, on which the 50 μm thick polyethylene terephthalate film (the same as that described above) was attached in the same manner, to prepare the laminated film. This laminated film is referred to as Material 3.

The same procedure was repeated to form an 8 μm thick acrylic-based adhesive layer, on which the 50 μm thick polyethylene terephthalate film (the same as that described above) was put in the same manner, to prepare the laminated film. This laminated film is referred to as Material 4.

The same procedure was repeated to form a 20 μm thick acrylic-based adhesive layer on the polyethylene terephthalate film surface of Material 4, on which the silicone resin-coated surface of the 38 μm thick releasing film of polyethylene terephthalate (Lintec Corp., SP-PET3811) was attached, to prepare the laminated hard coat film, having the structure shown in FIG. 1.

Example 2

A 100 μm thick polycarbonate film (Sansei Bussan Co., Ltd., Lexan 8010) was used as the base film, and coated on one side with an acrylic resin containing an ultraviolet absorber (Nippon Dacro Shamrock Co., Ltd., SolGard Primer 85B-2) to form the primer layer (adhesion-improving layer) by a Meyer bar to a thickness of 5 μm on a dry basis, dried at 100° C. for 1 minute. The primer layer was further coated with a silicone-based hard coating agent (Nippon Dacro Shamrock Co., Ltd., SolGard NP-730) by a Meyer bar to a thickness of 3 μm on a dry basis, dried at 130° C. for 3 minutes, to prepare the hard coat film. This coated film is referred to as Material 1.

Next, a 50 μm thick polyethylene terephthalate film (Toyobo Co., Ltd., A4300, Charpy impact strength: 25 kg-cm/cm$^2$) was coated with an acrylic-based adhesive (Lintec Corp., PU-V) by a comma coater to form the adhesive layer to a thickness of 15 μm on a dry basis, dried at 100° C. for 3 minutes. The polycarbonate film surface of Material 1, i.e., the side not coated with the silicone-based hard coating agent, was attached on the above-mentioned adhesive layer. This laminated film is referred to as Material 2.

The polyethylene terephthalate film surface of Material 2 was coated with a 20 μm thick acrylic-based adhesive layer, on which the silicone resin-coated surface of the 38 μm thick releasing film (Lintec Corp., SP-PET3811) was attached, to prepare the laminated hard coat film, having the structure shown in FIG. 2.

Example 3

A 100 μm thick polycarbonate film (Sansei Bussan Co., Ltd., Lexan 8010) was used as the base film, and coated on one side with an acrylic resin-containing an ultraviolet absorber (Nippon Dacro Shamrock Co., Ltd., SolGard Primer 85B-2) to form the primer layer (adhesion-improving layer) by a Meyer bar to a thickness of 5 μm on a dry basis, dried at 100° C. for 1 minute. The primer layer was further coated with a silicone-based hard coating agent (Nippon Dacro Shamrock Co., Ltd., SolGard NP-730) by a Meyer bar to a thickness of 3 μm on a dry basis, dried at 130° C. for 3 minutes, to prepare the hard coat film. This coated film is referred to as Material 1.

Next, a 38 μm thick releasing film (Lintec Corp., SP-PET3811) was coated on the silicone resin-coated surface thereof with an acrylic-based adhesive (Lintec Corp., PU-V) by a comma coater to form the adhesive layer of a thickness of 15 μm on a dry basis, dried at 100° C. for 3 minutes. The polycarbonate film surface of Material 1, i.e., the side not coated with the silicone-based hard coating agent, was attached on the above-mentioned adhesive layer. This laminated film is referred to as Material 2.

Another 38 μm thick releasing film (Lintec Corp., SP-PET3811) was coated on the silicone resin-coated surface thereof with an acrylic-based adhesive in the same manner by a comma coater to form the adhesive layer of a thickness of 20 μm on a dry basis, dried at 100° C. for 3 minutes. It was attached on a 100 μm thick separately prepared polycarbonate film (Sansei Bussan Co., Ltd., Lexan 8010, Charpy impact strength: 20 kg-cm/cm$^2$), to prepare the laminated film. This laminated film is referred to as Material 3.

Next, material 2 was attached on the polycarbonate film surface of Material 3, after the releasing film of the former was removed, to prepare the laminated hard coat film, having the structure shown in FIG. 3.

Comparative Example 1

A 100 μm thick polycarbonate film (Sansei Bussan Co., Ltd., Lexan 8010) was used as the base film, and coated on one side with an acrylic resin containing an ultraviolet absorber (Nippon Dacro Shamrock Co., Ltd., SolGard Primer 85B-2) to form the primer layer (adhesion-improving layer) by a Meyer bar to a thickness of 5 μm on a dry basis, dried at 100° C. for 1 minute. The primer layer was further coated with a silicone-based hard coating agent (Nippon Dacro Shamrock Co., Ltd., SolGard NP-730) by a Meyer bar to a thickness of 3 μm on a dry basis, dried at 130° C. for 3 minutes, to prepare the hard coat film. This coated film is referred to as Material 1.

Next, a 38 μm thick separately prepared releasing film (Lintec Corp., SP-PET3811) was coated on the silicone resin-coated surface thereof with an acrylic-based adhesive by a comma coater to form the adhesive layer to a thickness of 20 μm on a dry basis, dried at 100° C. for 3 minutes. The polycarbonate film surface of Material 1, i.e., the side not coated with the silicone-based hard coating agent, was attached on the above-mentioned adhesive layer, to prepare the hard coat film, having the structure shown in FIG. 4.

Comparative Example 2

A 50 μm thick polyethylene terephthalate film (Toyobo Co., Ltd., A4300) was used as the base film, and coated on one side with an acrylic-based, ultraviolet-curable type hard coating agent (Toagosei Co., Ltd., Aronix UV-3701) by a Meyer bar to a thickness of 3 μm on a dry basis, thereby irradiated with ultraviolet tray of 250 mJ/cm$^2$ in luminous energy, to prepare the hard coat. Next, the polyethylene terephthalate film was coated with an acrylic-based adhesive (Lintec Corp., PU-V) by a comma coater, on the side not coated with the above-mentioned hard coating agent, to form the adhesive layer to a thickness of 20 μm on a dry basis, dried at 100° C. for 3 minutes. A 38 μm thick releasing film (Lintec Corp., SP-PET3811) was attached on the above-mentioned adhesive layer, to prepare the hard coat film, having the structure shown in FIG. 5.

TABLE 1

Samples tested for resistance to weather

| | Change of appearances | Adherence of coating coating film | Resistance to scratching | Falling ball test results |
|---|---|---|---|---|
| EXAMPLE 1 | No abnormality observed | good | good | good |
| EXAMPLE 2 | No abnormality observed | good | good | good |
| EXAMPLE 3 | No abnormality observed | good | good | good |
| COMPARATIVE EXAMPLE 1 | No abnormality observed | good | good | bad |
| COMPARATIVE EXAMPLE 2 | Coating film turning yellow | bad | bad | bad |

What is claimed is:

1. A hard coat film comprising a silicone-based hard coat layer provided on one side of a multi-layered base having a total thickness of 350 μm or less and consisting of a plurality of the same first resin film and one or more of a second different resin film laminated, wherein the first resin film contains a weather-resistant film comprising resins selected from the group consisting of styrene-based resins, polycarbonate resins, and combinations thereof, and the second resin film contains a weather-resistant film comprising resins selected from the group consisting of styrene-based resins, polycarbonate resins, and combinations thereof, and one of the first resin film and the second resin film comprises an impact-resistant film having a Charpy impact strength of at least 10 kg-cm/cm$^2$. wherein the hard coat film is applied to the external surfaces of window panes or plastic boards for windows.

2. The hard coat film according to claim 1 for protecting window panes of vehicles running at a high speed.

3. The hard coat film according to claim 1, wherein said weather-resistant resin film containing an ultraviolet absorber is of polycarbonate containing an ultraviolet absorber.

4. The hard coat film according to claim 3, wherein a releasing sheet is provided via an adhesive layer on a side made of said multi-layered base opposite to a side provided with said silicone-based hard coat layer.

5. The hard coat film according to claim 1, wherein a releasing sheet is provided via an adhesive layer on a side made of said multi-layered base opposite to a side provided with said silicone-based hard coat layer.

6. The hard coat film according to claim 5, wherein a releasing sheet is provided via an adhesive layer on a side made of said multi-layered base opposite to a side provided with said silicone-based hard coat layer.

7. The hard coat film according to claim 1, wherein said silicone-based hard coat layer is provided on said weather-resistant resin film of the multi-layered base.

8. The hard coat film according to claim 7, wherein said weather-resistant resin film contains an ultraviolet absorber.

9. The hard coat film according to claim 7, wherein said weather-resistant resin film is made of polycarbonate.

10. The hard coat film according to claim 7, wherein a releasing sheet is provided via an adhesive layer on a side made of said multi-layered base opposite to a side provided with said silicone-based hard coat layer.

* * * * *

UNITED STATES PATENT AND TRADEMARK OFFICE
CERTIFICATE OF CORRECTION

PATENT NO. : 6,773,778 B2
DATED : May 25, 2004
INVENTOR(S) : August 10, 2004

It is certified that error appears in the above-identified patent and that said Letters Patent is hereby corrected as shown below:

Title page,
Item [56], References Cited, U.S. PATENT DOCUMENTS, after the first patent, No. 3,810,815, "5/1974" should read -- 7/1969 --
Item [57], ABSTRACT,
Line 1, "film is providend" should read -- film is provided --

Column 1,
Line 34, "required to be high" should read -- required to be highly --

Signed and Sealed this

Fifth Day of April, 2005

JON W. DUDAS
*Director of the United States Patent and Trademark Office*